United States Patent [19]

Rhodes

[11] 4,366,422

[45] Dec. 28, 1982

[54] VELOCITY SENSING PULSE PAIR SERVO APPARATUS

[75] Inventor: Melvin H. Rhodes, Cedar Rapids, Iowa

[73] Assignee: Rockwell International Corporation, El Segundo, Calif.

[21] Appl. No.: 181,297

[22] Filed: Aug. 25, 1980

[51] Int. Cl.³ .............................................. G05B 13/00
[52] U.S. Cl. .................................... 318/561; 318/609; 318/616; 318/632; 318/685
[58] Field of Search ............... 318/561, 615, 616, 632, 318/331, 609, 610, 685

[56] References Cited

U.S. PATENT DOCUMENTS

| | | | |
|---|---|---|---|
| 2,946,943 | 7/1960 | Nye et al. | 318/610 |
| 4,004,206 | 1/1977 | Gompert | 318/331 |
| 4,099,112 | 7/1978 | Klinger | 318/561 |
| 4,143,310 | 3/1979 | Fujinawa et al. | 318/571 |

Primary Examiner—J. V. Truhe
Assistant Examiner—Eugene S. Indyk
Attorney, Agent, or Firm—Bruce C. Lutz; Howard R. Greenberg; H. Fredrick Hamann

[57] ABSTRACT

A servo mechanism is illustrated whereby movement of a motor device subsequent to application of drive signals is sensed to determine erroneous movement due to detrimental forces such as spring action. Compensating signals are generated to modify the drive signals whereby the motor is accurately step positioned with each set of drive pulses.

8 Claims, 10 Drawing Figures

VELOCITY SENSING PULSE PAIR SERVO APPARATUS

THE INVENTION

The present invention is generally related to electronics and more specifically related to servo mechanisms.

For many years small DC motors have been used to drive servo mechanisms. However, these servo mechanisms have had several deficiencies. One is the tracking at low velocity which becomes very jerky due to torque variations. Another deficiency is that with a high loop gain the servo would follow noise on command inputs and produce large jumps in the output display. This last deficiency can be minimized by increasing the gear ratio between the motor and the display but this is a costly solution. Further, with a large gear ratio, mechanical limit stops are difficult to make without having to use slip clutches between the motor and the display.

The present concept is an attempt to provide the function of reducing servo loop gain in terms of radian/second/radian error, provide velocity limiting and not increase the torque to destructive levels at the display output. This is accomplished by using pulse pair torquing methods to drive the servo.

It was quickly ascertained that various detrimental repositioning forces prevented accurate operation with unidirectional pulses. These forces included magnetic detents and spring detents such as that occurring in a cantilever brush system where the slight rolling of the brush will allow the rotor to rotate as much as a half degree without the brush sliding on the commutator. Since the magnitude of these forces changed depending upon the position of the rotor and the direction of rotation, an adaptive feedback system had to be designed to adjust the effect of the pulse pair for specific motor conditions.

As will be realized by those skilled in the art, under theoretically perfect conditions a pulse pair will operate to accelerate a motor on the first pulse of the pulse pair and to decelerate the motor to a rest position with the second pulse. The detrimental forces would operate to move the motor either less or more than the desired amount and thus the adaptive feedback system is used to compensate whereby the motor will move a given amount with each pulse pair.

The servo system of the present invention applies a pulse pair to the motor to reposition the motor and then senses the velocity rate of the motor subsequent to the application of the pulse pair. The sensed velocity rate of the motor is obtained by sampling the mechanical position of the motor at two given sample periods subsequent to the application of the pulse pair signals. Any difference between the two position samples indicate the motor has moved thereby indicating the motor is not at rest. The resulting differential signal is held for summation with the next pulse pair. The differential signal is, of course, indicative of the velocity of the motor for the period between pulse pairs. The normal reason for this change in position is due to detrimental forces or torques which will move the motor to a new position subsequent to the application of the pulse pair. Using the teachings of the present invention will result in an increase in accuracy of the servo system. In accordance with normal feedback techniques, the effect of the input signal is reduced as the motor approaches the commanded input signal designated position.

It is therefore an object of the present invention to provide an improved servo mechanism apparatus incorporating detrimental torque compensating techniques.

Other objects and advantages of the present invention may be ascertained from a reading of the specification and dependent claims in conjunction with the drawings wherein:

DETAILED DESCRIPTION

Figure 1:
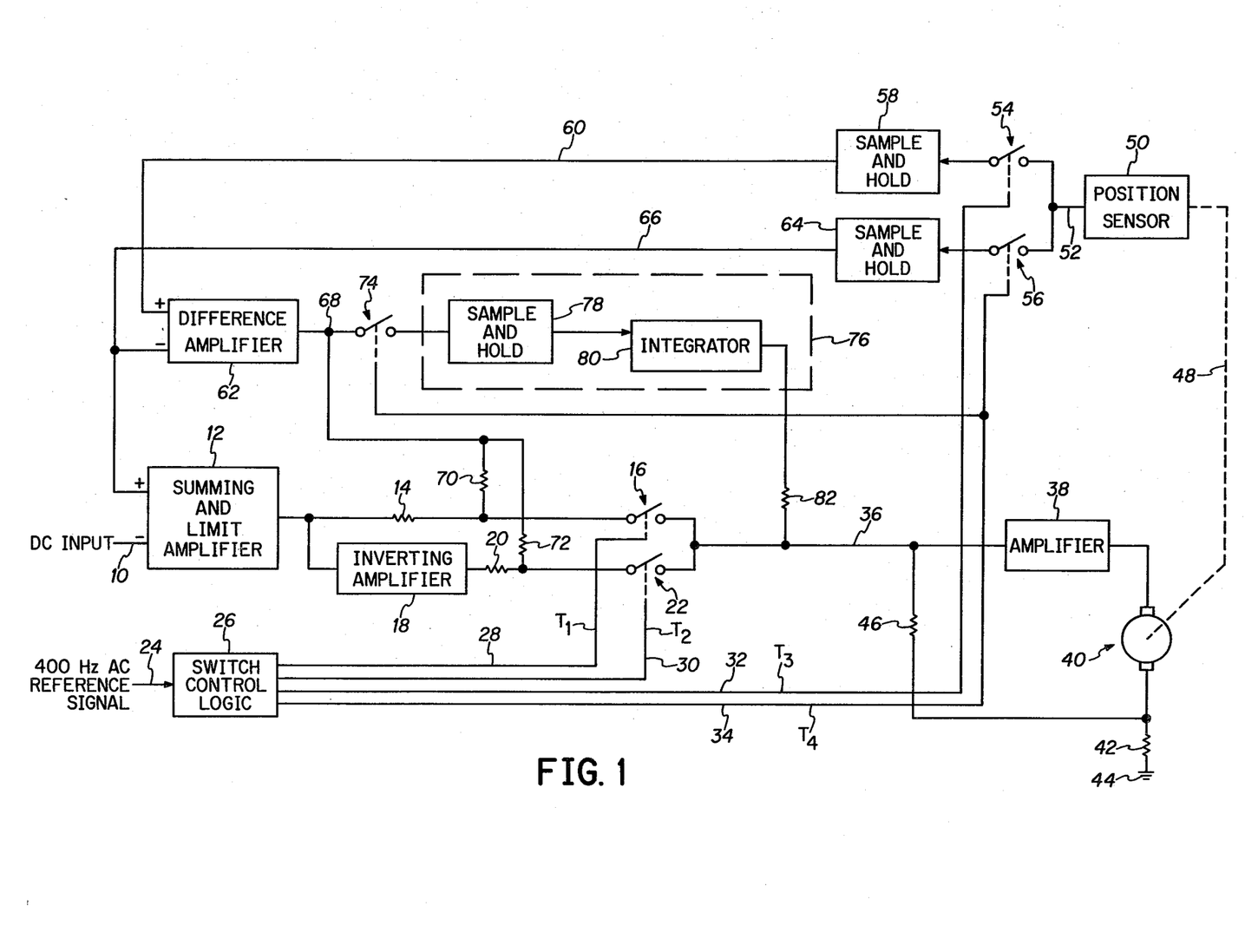
FIG. 1 is a block diagram using sample and hold techniques to obtain the velocity rate or position movement signal.

In FIG. 1, a DC input command signal is supplied on lead 10 to a summing and limit amplifier 12 which provides an output through a resistor 14 to a switch generally designated as 16. The output from amplifier 12 is also supplied through an inverting amplifier 18 and a resistor 20 to a similar switch generally designated as 22. A 400 hertz AC reference signal is supplied on a lead 24 to a switch logic control block 26 which provides four output leads 28, 30, 32 and 34. Leads 28 through 34 provide signals designated as $T_1$ through $T_4$ respectively. The signals on leads 28 and 30 operate switches 16 and 22 respectively wherein the appearance of the signals $T_1$ and $T_2$ operate to close switches 16 and 22 respectively. The outputs of switches 16 and 22 are tied together to a lead 36 which provides input signals to a motor drive amplifier 38 which supplies signals to a first brush of a DC motor generally designated as 40. A resistor 42 is connected between motor 40 and ground 44. A feedback resistor 46 is connected from a second brush of motor 40 to lead 36. A mechanical position linkage 48 supplies signals indicative of motor position to a position sensor 50 which supplies output signals on a lead 52 to a pair of switches 54 and 56 respectively. Switches 54 and 56 are operated by signals $T_3$ and $T_4$ on leads 32 and 34 respectively. An output of switch 54 is supplied to a sample and hold circuit 58 which supplies outputs on a lead 60 to a difference amplifier 62. An output of switch 56 is supplied to a sample and hold circuit 64 which supplies output signals on a lead 66 to a second input of difference amplifier 62 as well as to an input of amplifier 12. Difference amplifier 62 supplies output signals to a junction point 68 which supplies signals through a pair of resistors 70 and 72 to the switches 16 and 22 respectively. The resistors 70 and 14 act as summing resistors for signals applied thereto while resistors 20 and 72 provide similar summing functions. The junction point 68 is also connected through a switch generally designated as 74 to an input of a dash line block 76. Dash line block 76 is an optional block used to improve operation of the servo circuit to compensate for a spring bias.

In other words, the signals supplied from block 76 provide a spring bias torque signal. A sample and hold circuit 78 receives signals input to block 76 and provides these sampled signals to an integrator 80 which provides output signals through a resistor 82 to lead 36 connected to the input of amplifier 38. Switch 74 is operated via the $T_4$ signals from lead 34.

Also, the position sensor 50 in combination with sample and hold circuits 58 and 64 and difference amplifier 62 constitute a velocity rate sensing means, position movement means or compensation signal generating means.

Figure 2:
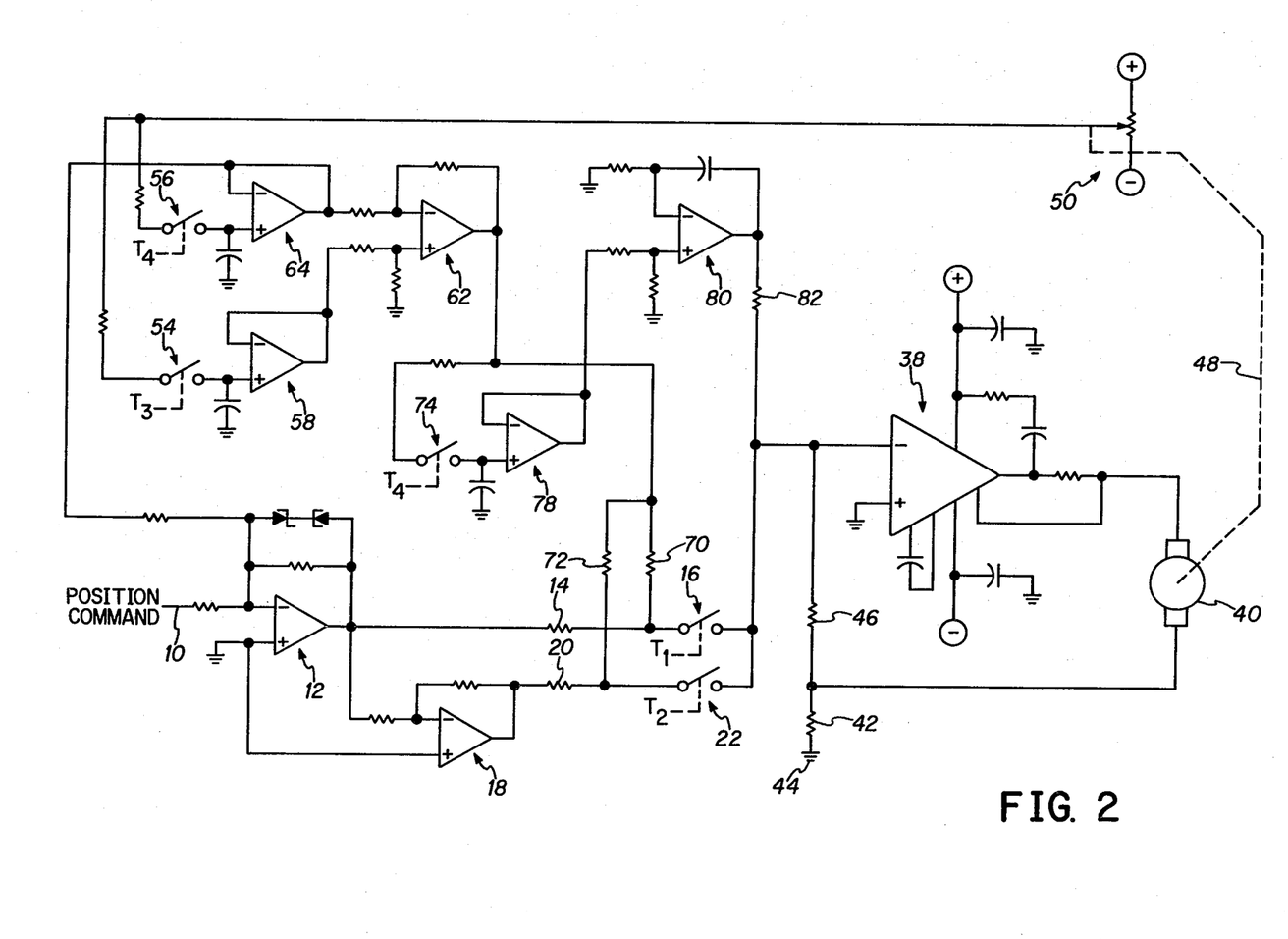
FIG. 2 is a detailed circuit diagram of FIG. 1.

In FIG. 2, the same designations are used as in FIG. 1 where appropriate and it is believed that the details of this circuit diagram are clear enough to not require further explanation.

Figure 3:
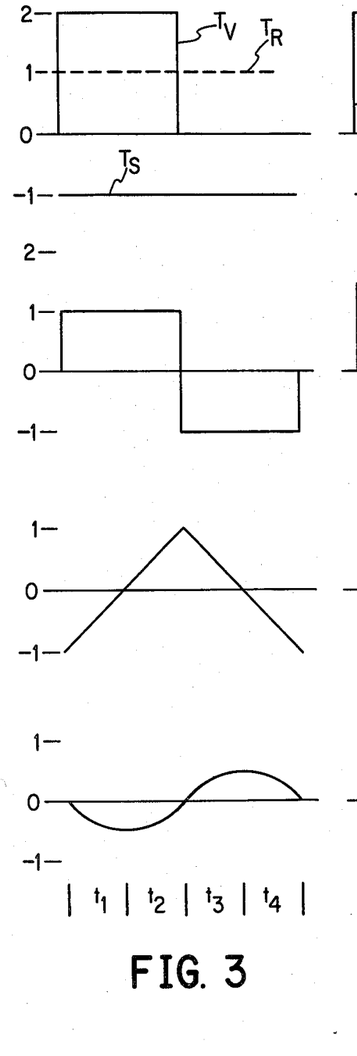
FIGS. 3, 4 and 5 contain waveforms used in explaining the operation of FIG. 1.
Figures 4, 5:
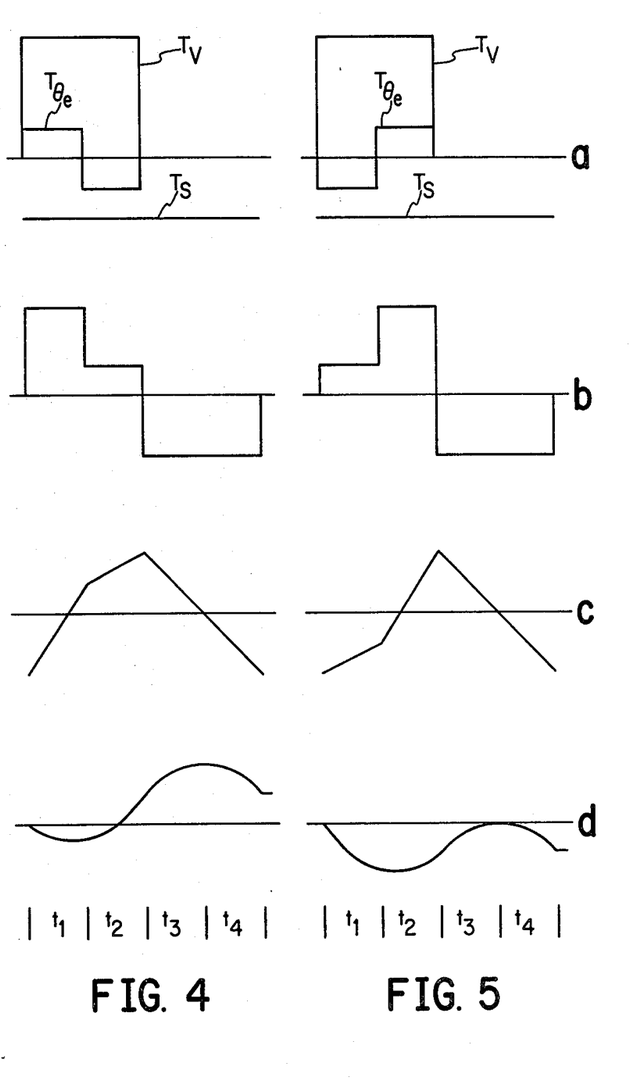

FIG. 3 illustrates the various waveforms of force, acceleration, velocity and position for different time periods in the servo mechanism operation. In the presentation of FIG. 3 it is assumed that there is no input signal and that the only forces are the spring force $T_s$ and the feedback signal $T_v$ from the position sensing or velocity sensing circuit comprising the blocks 50 through 62. It will be noted that the total force seconds (area) of waveform $T_v$ is equal and opposite waveform $T_s$. Although $T_s$ is half the amplitude, it is continuous whereas $T_v$ is periodic. Waveform 4b illustrates the summation of these two forces ($T_v$ and $T_s$) and provides the waveform based on acceleration which has a sum total of zero. Waveform 4c illustrates the velocity of the motor and shows that the motor is continually oscillating from one direction to the opposite direction with the velocity force torque accelerating it in one direction and the spring force accelerating it in the opposite direction when the velocity torque is no longer applied. Thus, the position as shown in FIG. 4d is continually changing about an axis which in one embodiment of the invention comprised a total movement of approximately 0.000025 radians. As will be observed, the timing, throughout FIGS. 3 through 5, is divided into four time segments ($t_1$ through $t_4$) with each segment comprising one-quarter of the waveform.

An input signal labeled as $T_{\theta e}$ (torque $\theta$ error) and comprising a pulse pair is illustrated in 4a. This pulse waveform is summed into the total forces to produce the resultant waveform of 4b. These forces of 4b produce the acceleration of 4c and the resultant movement of the motor as illustrated in 4d.

FIG. 5 illustrates an input error voltage $T_{\theta e}$ of the opposite sense to move the motor in the opposite direction and produces the waveforms illustrated.

Figure 6:
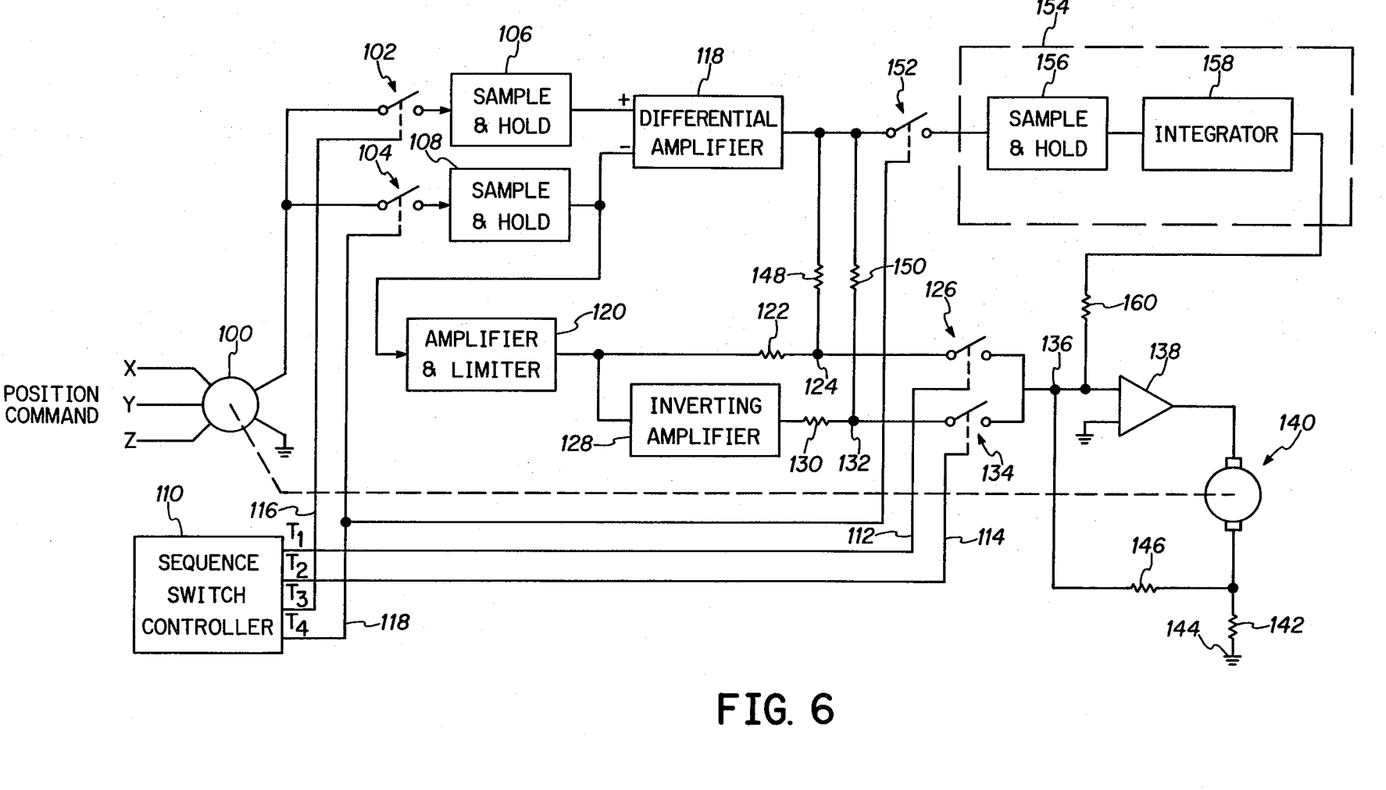
FIG. 6 is a block diagram of an AC or synchro servo system for accomplishing the objectives of the present invention.

In FIG. 6 the position command signals are supplied on X, Y and Z leads to a synchro 100 which supplies output signals through switches 102 and 104 to sample and hold circuits 106 and 108 respectively. A sequence switch controller 110 supplies output signals $T_1$ through $T_4$ on leads 112, 114, 116 and 118 respectively. An output from sample and hold circuit 106 is supplied to a plus or noninverting input of a differential amplifier 118 while an output from sample and hold circuit 108 is supplied both to the negative or inverting input of differential amplifier 118 and to an amplifier and limiter circuit 120. An output of amplifier 120 is summed through a summing resistor 122 to a junction point 124 which supplies input signals to a switch generally designated as 126 and operated via $T_1$ signals on lead 112. The output from amplifier 120 is also supplied to an inverting amplifier 128 which supplies signals through a summing resistor 130 to a junction point 132 which is connected to a switch generally designated as 134 operated via $T_2$ signals on lead 114. The output of switches 126 and 134 are connected together to a junction point 136 and input to a motor drive amplifier 138. Output signals from 138 are applied to one brush of a DC motor generally designated as 140 having its other brush connected through a resistor 142 to ground 144 and also through a feedback resistor 146 to junction point 136. Output signals from differential amplifier 118 are connected through summing resistors 148 and 150 to junction points 124 and 132 respectively. The output signals from differential amplifier 118 are also connected to a switch 152 which is operated in accordance with $T_4$ signals on lead 118. The switch 152 supplies input signals to an optional circuit 154 which is similar to the optional block 76 of FIG. 1. Within block 154 is a sample and hold circuit 156 and an integrator 158. Signals input to block 154 are sampled and integrated and supplied via a resistor 160 to junction point 136 to be summed with other signals received from the synchro 100.

Figure 7:
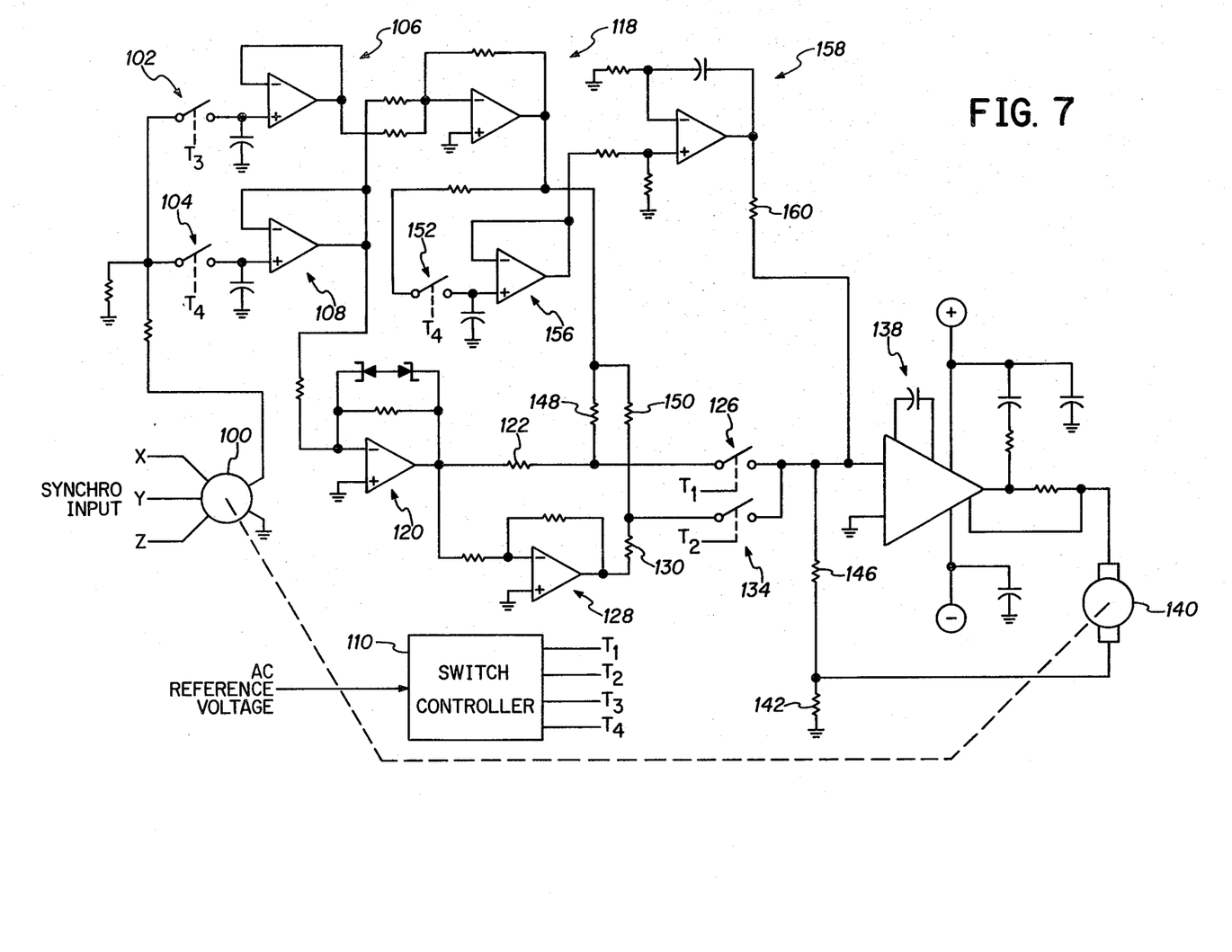
FIG. 7 is a detailed block diagram of FIG. 6.

The detailed block diagram of FIG. 7 has the same designations where appropriate as used in FIG. 6 and further explanation is believed unnecessary.

Figure 8:
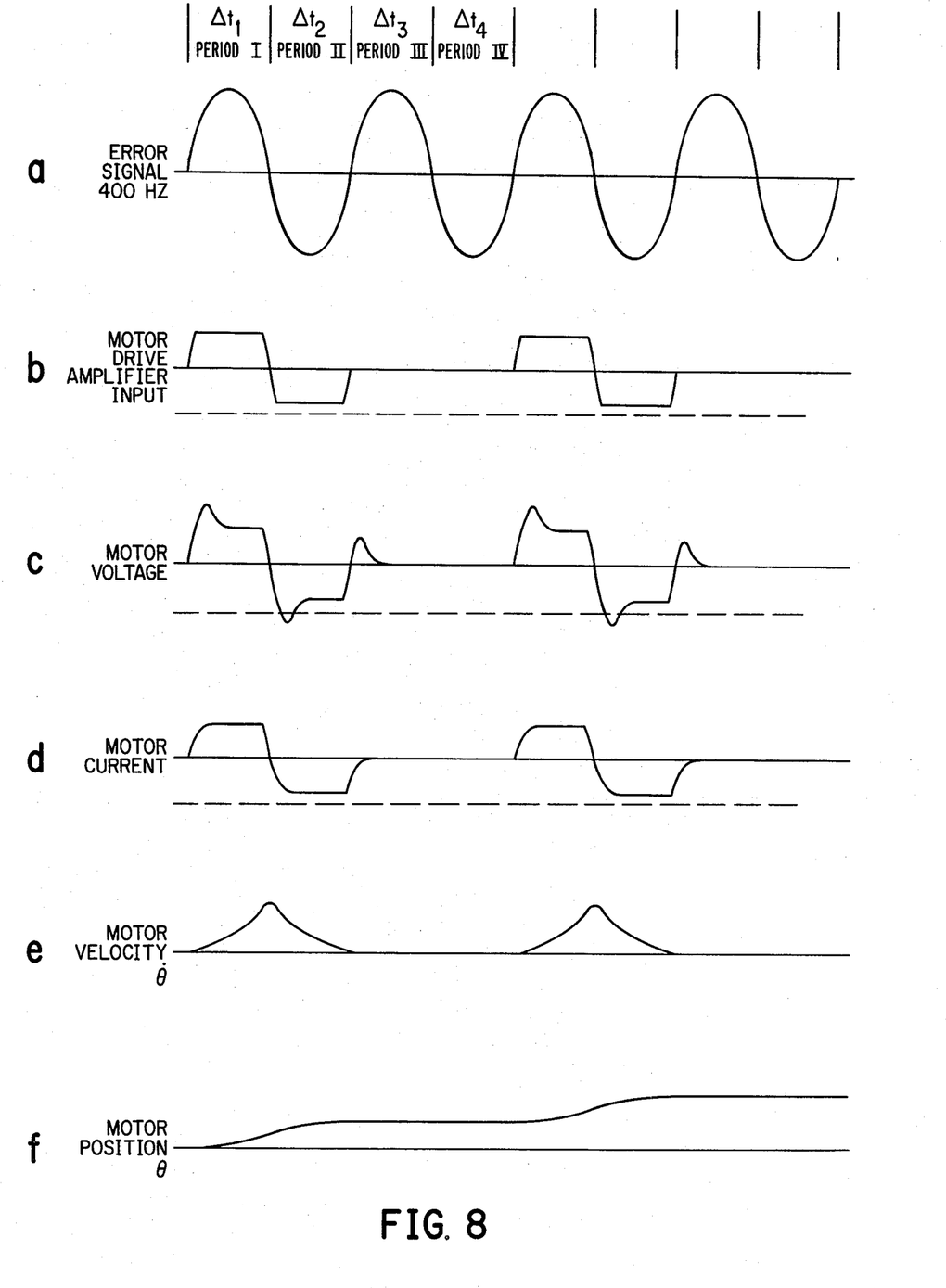
FIG. 8 comprises a series of waveforms used in explaining either FIGS. 1 or 6.

In FIG. 8 the waveforms illustrate a general condition with no detrimental respositioning forces illustrated since these would tend to complicate the illustrative waveforms. However, the detrimental forces would be similar in nature to those illustrated in connection with FIGS. 3 through 5. Waveform A of FIG. 8 illustrates the error signal being received from synchro 100 by the sample and hold circuits 106 and 108 during their respective time periods. The solid waveform in 8b illustrates the AC portion of the signal being received by amplifier 138 and the dash line indicates a steady state bias received from integrator 158 in the optional bias block 154. The solid waveform in 8c illustrates the voltage applied to motor 160 and a dash line represents the optional bias voltage. Waveforms 8d illustrate the primary and optional bias currents generated in response to the applied motor voltage signals. The velocity of the motor is illustrated in waveform 8e and the position is illustrated in waveform 8f.

Figure 9:
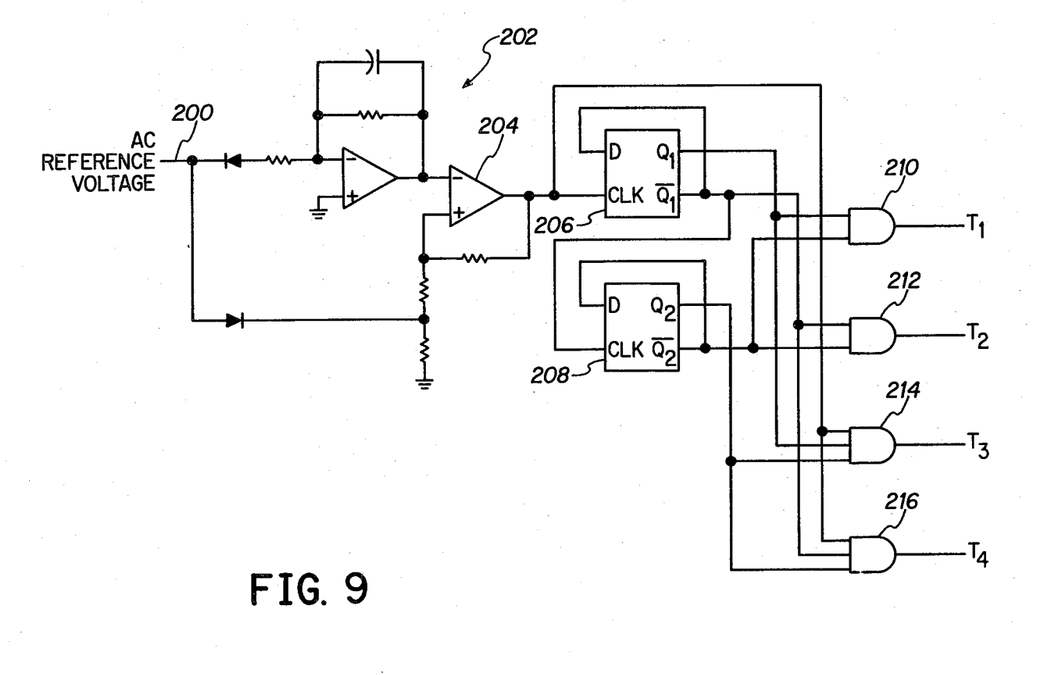
FIG. 9 illustrates one embodiment of a switch sequence controller for use in FIGS. 1 or 6.

In FIG. 9 an AC reference voltage is applied on lead 200 to a filter generally designated as 202 which supplies its output to a differential amplifier 204. The input signals from reference voltage lead 200 are also applied in a divided manner to differential amplifier 204. The output of amplifier 204 is supplied to a divider network comprising a pair of D flip-flops 206 and 208. By combining the outputs from flip-flops 206 and 208 as shown, a series of signals $T_1$ through $T_4$ are obtained from AND gates 210, 212, 214 and 216.

Figure 10:
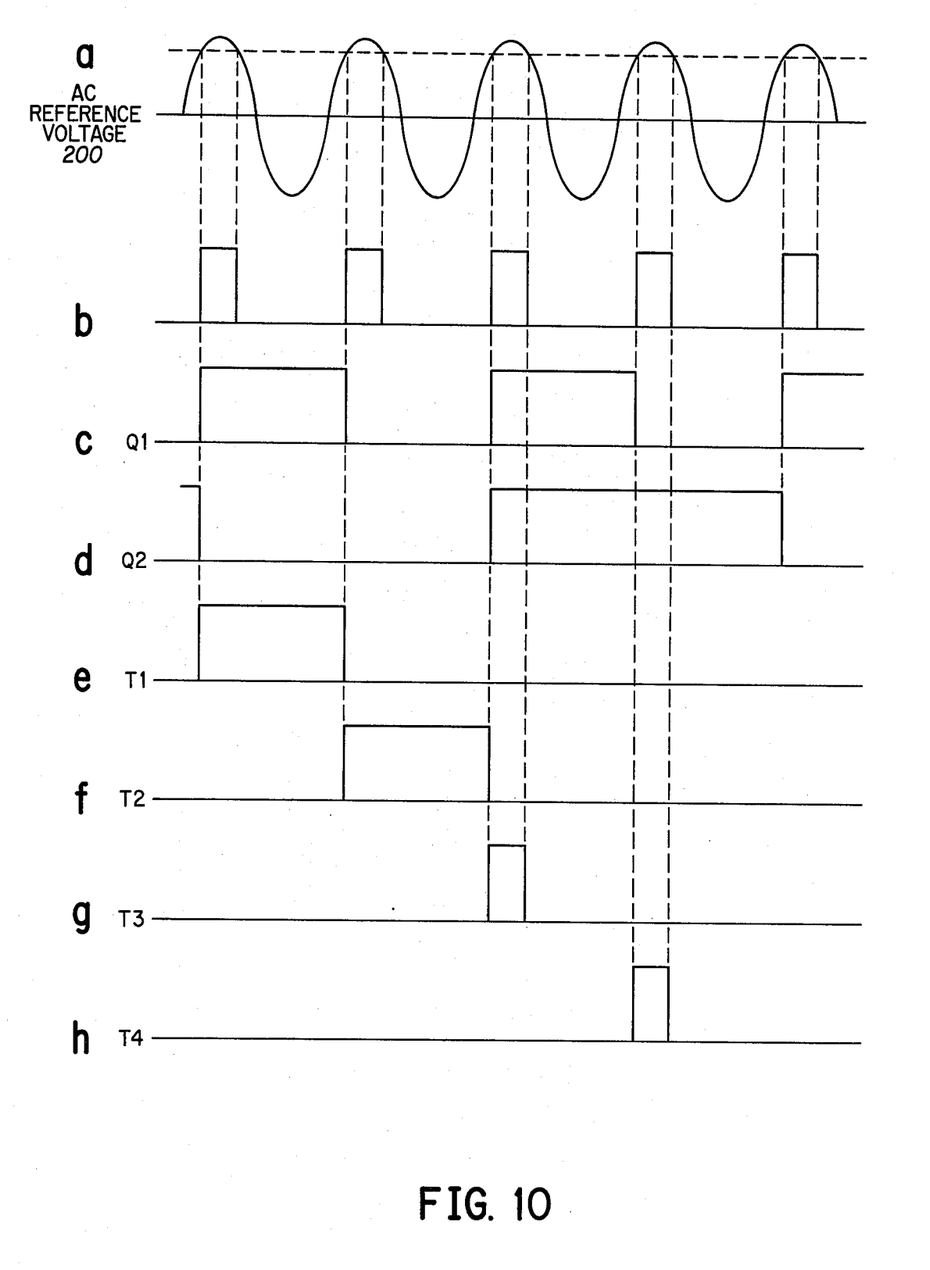
FIG. 10 comprises a series of waveforms used in explaining the operation of FIG. 9.

The waveforms found in the circuit of FIG. 9 are illustrated in FIG. 10 with the AC reference voltage 200 being the first waveform. The timing pulses in waveform 10b appear at the output of amplifier 204 since the rectifier and level setting circuit 202 produces a self-adjusting reference voltage used to cut off the AC reference and provide these timing pulses. As will be observed, the circuit produces substantially the same width pulses regardless of variations in AC reference level signals. The Q1 and Q2 outputs of the two flip-flops are illustrated in waveforms 10d and 10e while different width timing pulses T1 to T4 are found in waveforms 10e through 10h. Since the operation of D flip-flops and AND gates along with voltage sensitive switching amplifiers are well-known, it is believed that further explanation of the operation of the switch sequence controller is unnecessary.

OPERATION

As was previously indicated, the present invention uses a pair of pulses, the first of which gives an acceleration for a given period of time in one direction and during a second time period is in the opposite direction for deceleration.

If a single pulse drive were used, it would be very nearly like positioning an object on a flat surface by tapping it with a hammer. The hammer would deliver a pulse to the object which accelerates the object to a certain velocity and then the friction between the objective and the surface decelerates the object to zero velocity. The pulse magnitude would be controlled by the weight and speed of the hammer or the material between the hammer and the object. A person swinging the hammer adjusts the pulse magnitude to fairly accurately position the objective. However, if the friction on the surface is not constant, it can be very difficult to accurately position the object. Somewhat similar conditions occur in the operation of a motor due to magnetic detents, stiction, running friction and spring forces. Each of these forces may have different magnitudes at different rotational positions and may have different magnitudes for one direction of rotation than for the other direction.

Since an objective of this servo mechanism concept was to provide a slow movement rate with a given accuracy, which visually appeared at the output indicator to operate in a smooth manner, without the use of a tachometer generator, it was decided that a pulse pair might profitably be used. If the pulse torque is much larger than frictional and other detrimental torques, the accuracy of the angle moved is fairly good. However, as the size of the angle to be moved by a given torque pulse pair is decreased these detrimental forces become increasingly important. Thus, to produce good predictable results torque pulses much larger than the frictional torques are required (resulting in large jumps of the indicator, i.e., nonsmooth manner) or else compensation must be made for the frictional torques.

To compensate for these detrimental forces, a position sensor was mechanically tied to the motor and sample and hold signals were taken at two times subsequent to the pulse pair drive circuit. If there is still movement of the motor at this time due to the detrimental torques subsequent to the pulse pair, the two sampled signals will be different. These two signals are applied to the difference amplifier and used to compensate the individual pulses of the pulse pair. The position signal sampled is also fed back to the summing and limit amplifier to be compared with the input command position signal to determine if there is still an error in the commanded position.

Referring now specifically to FIG. 1, it will be noted that the input signal is supplied on lead 10 and is divided into an original and inverted signal immediately after being output from amplifier 12. These original and inverted signals are applied to summing circuits including resistors 14 and 20. At this point they are summed with the compensating signals and applied through switches 16 and 22 at the appropriate times designated by $t_1$ and $t_2$ to the amplifier 38 so as to accelerate motor 40 and then decelerate it to zero velocity. Subsequent to the application of the pulse pair the signal is sampled at times $t_3$ and $t_4$. If the sampled position as returned on lead 66 to amplifier 12 indicates that it coincides with the command signal, there will be no further output from amplifier 12. However, if there is a difference, normal servo feedback techniques are applied to continue positioning the motor 40 in a step fashion. In addition, the sample and hold circuits 58 and 64 check the position of the motor at two different times $t_3$ and $t_4$ subsequent to the application of the pulse pair. If these two sampled signals are different, the difference output is obtained from amplifier 62 and applied to the individual pulses of the pulse pair via resistors 70 and 72 as summed with the signals from resistors 14 and 20 respectively.

If there is going to be a bias force where the servo amplifier needs to hold its position against a reaction torque or force once it reaches a position such as the aileron or flaps of an airplane, it may be desirable to add an optional bias circuit such as that designated in dash line block 76. Within this block there are sample and hold circuits and integrator circuits 78 and 80 respectively which sample the difference output from difference amplifier 62 during each $t_4$ time. Any reaction torques will tend to move the motor in a manner similar to the detrimental torques. Thus, the integrator will accumulate these signals to produce a steady state bias which is applied to the amplifier 38 continuously since it is input at a point subsequent to the pulse pair switches 16 and 22. When the output from integrator 80 is exactly sufficient to counterbalance the reaction torques due to outside forces, the remaining signals will be on a sporadic basis due to respositioning of the motor in response to the DC input commands and thus the compensating signals can be of lesser magnitudes whereby greater accuracy in positioning may be obtained without overshoot or undershoot due to the detrimental forces.

The waveforms of FIG. 3 illustrate a condition where there is no error ($T_{\theta_e}$) DC input signal and the only signal being applied to motor 40 is from the position sensing or velocity sensing circuit to maintain the motor at a given average position. A spring force ($T_s$) is illustrated as being the only detrimental force. This force causes a movement of the motor output shaft 48 subsequent to the application of each pulse pair. The change in output shaft position is sensed by sensor 50 and the sample and hold circuits 58 and 64 and input to summing amplifier 12 as well as difference amplifier 62. If there is no optional reaction force circuit 76, the signals will build up to initiate pulse pair compensated signals through switches 16 and 22 to the amplifier 38. However, if the circuit 76 is included, the integrator 108 will accumulate the pulse pair signals to produce a steady state reaction signal shown as dash line $T_R$. When there is no reaction force circuit (similar to circuit 76), a pulse pair signal is generated in accordance with the total area of the signal $T_v$ and pulse pair signals are applied to motor 40 to continually return it to the desired position.

As will be realized, this spring force can resist or assist the direction the servo is commanded to move depending upon the design of the motor and direction of movement commanded for the motor.

Although the value of torque signal $T_V$ or reaction signal $T_R$ is shown constant during time periods $t_3$ and $t_4$, this value will alter as output from the sensing circuit in accordance with motor movement. However, as received by current amplifier 38, this is a substantially steady state value since it is subsequent to the sampling switches or integrator as the case may be.

As illustrated in FIG. 4, a command signal is applied in the form of $T_{\theta_c}$ which modifies a pulse signal received by the motor such that it accelerates faster during time period $t_1$ to result in a new position at the end of time period $t_4$ as illustrated in waveform 4d. When the motor command is in the opposite direction, the waveforms of FIG. 5 occur with the motor being moved in the opposite direction.

The detailed schematic diagram of FIG. 2 is very straightforward in view of the above explanation and the only comment believed necessary is that if it is known that the spring forces will be different in one direction of rotation of the motor than the other, the values of the resistors 14, 20, 70 and 72 in the two summing circuits can be adjusted to compensate for uneven restraining, reaction or detrimental repositioning forces to allow the circuit to operate more efficiently by providing passive rather than active compensation.

Very similar principles of operation are involved in the synchro circuit of FIG. 6 except that the mechanical feedback from motor 140 is applied to the synchro and the output of the synchro is supplied to the sample and hold circuits to obtain the compensating and command signals in the differential amplifier 18 and amplifier 120 respectively. Again, an optional reaction circuit 154 is illustrated to be used where it is known that there will be outside reaction forces on a steady state basis.

In operation, the sample and hold circuits 106 and 108 detect the position of the synchro 100 at time periods $t_3$ and $t_4$. If the position at time period $t_4$ is different from the input command signal position, the amplifier 120 will receive the signal and produce a pulse pair using the inverting amplifier 128. If the positions or signals received at time periods $t_4$ and $t_3$ are different, the differential amplifier 118 will provide an output which will adjust the amplitudes of the two pulses of the pulse pair so as to provide a compensated pulse pair signal to motor drive amplifier 138 which passes these signals on to motor 140.

The detailed circuit diagram of FIG. 7 as well as the block diagram of FIG. 6 illustrate the summing resistors 122, 130, 148 and 150. These resistors can be adjusted in the same manner as mentioned in conjunction with FIG. 1 if there is a known difference in detrimental spring forces in one direction of rotation than would occur in the other.

FIG. 8 shows the motor position changing over a period of time and is applicable to either FIGS. 1 or 6. As illustrated, there are two pulse pair signals as represented by any of waveforms b through d in FIG. 8 and the motor velocity is illustrated as rising to a peak and then falling to zero in each case. Obviously, if detrimental spring forces were involved, or if compensating signals were not applied, the motor velocity would not be reduced to zero at the end of each pulse pair. Thus, the motor would not be accurately positioned in a small step as desired to provide a smooth indication of movement to an observer.

As explained before, the switch controller of FIG. 9 produces the timing pulses in accordance with well-known D flip-flop techniques subsequent to the generation of the timing pulses as obtained through the use of the rectifier and level setting circuit of FIG. 202 in combination with the differential amplifier of 204 which acts to pass the positive peaks in obtaining the pulses of waveform b in FIG. 10.

Although I have presented two embodiments of my inventive concept, it is to be realized that the concept can be practiced in other forms and I wish therefore to be limited only by the scope of the appended claims wherein I claim.

I claim:

1. Servo apparatus comprising, in combination:
   amplifier means including first and second input means and first and second output means, the signals output at said second output means, being inverted relative those output at said first output means, said amplifier means providing pulse pair output signals at said output means thereof;
   load means for providing a mechanical position output in response to an electrical input signal;
   velocity sensing means, connected to said load means, for sensing position change of said mechanical output of said load means over a predetermined time subsequent to application of the pulse pair output signal to said load means and supplying compensation signals indicative of sensed position change; and
   summing means, connected between said amplifier means, said velocity sensing means and said load means for supplying compensated pulse pair signals to reposition the mechanical output of said load means in discrete steps whereby the compensation provided is for forces detrimental to predetermined distance movements.

2. Apparatus as claimed in claim 1 comprising, in addition:
   integration means connected between said sensing means and said load means for accumulating compensating signals to provide a steady state bias signal to said load means in addition to said compensated pulse pair signals.

3. Pulse operated position stepping servo apparatus comprising, in combination:
   motor means including electrical signal input means and mechanical position output means;
   velocity sensing means, connected to said motor means, for providing a first output signal indicative of magnitude of motor output position movement during a given time period subsequent to application of a control drive signal;
   command signal input means for supplying command signals; and
   summing means connected to said motor means, said velocity sensing means and said command signal input means for applying to said motor means control drive signals comprising pulse pairs, said control signal operating to step position said motor means by a given position increment for each pulse pair, the control signal being a composite of signals input to said summing means, the command signal being compensated by said first output signal to correct for detrimental forces acting to prevent said motor means position output means for halting in a position dictated by the last applied pulse pair control signal.

4. Pulse pair operated servo apparatus comprising, in combination:
   motor means including control signal input means and mechanical position output means;
   velocity sensing means, connected to said motor means, for providing a first output signal indicative of magnitude of motor output position movement during a given time period subsequent to cessation of a control signal used to drive said motor means;

command signal input means for supplying command signals;

summing means connected to said motor means, said velocity sensing means and said command signal input means for applying to said motor means said control signal comprising a pulse pair, said control signal operating to step position said motor means by a given position increment, the control signal being a composite of signals input to said summing means, the command signal being compensated by said first output signal to correct for detrimental forces acting to prevent said motor means position output means from halting in a position dictated by the last applied pulse signal; and integration means, connected to said operating in conjunction with said summing means, for integrating the difference between signals indicative of commanded and actual positions, and applying the integrated result to the composite for producing said control signal.

5. The method of compensating for detrimental forces acting to prevent accurate positioning of a mechanical output of a servoed motor loop comprising, the steps of;

applying pulse pair waveform signals to a motor means for accelerating and decelerating a mechanical output of said motor means to a new position in response to command signals;

sensing rate of movement of the mechanical output of said motor means subsequent to application of said pulse pair waveform signals; and modifying the waveform of said pulse pair signals toward a waveform which will increment the motor means output by a standardized step in accordance with the sensed rate of movement of the mechanical output of said motor means subsequent to application of said pulse pair waveform signal.

6. Apparatus for compensating for detrimental forces acting to prevent accurate positioning of a mechanical output of a servoed motor loop comprising, in combination:

motor means;

input means for supplying command signals to control the position of a mechanical output of said motor means;

modifying means, connected to said input means and including rate input means, for applying pulse pair waveform signals to said motor means for accelerating and decelerating the mechanical output of said motor means to a new position in response to said command signals;

sensing means for sensing rate of movement of the mechanical output of said motor means subsequent to application of said pulse pair waveform signals and supplying a rate output signal indicative of the sensed rate of movement; and connecting means for connecting said sensing means to said modifying means for modifying the waveform of said pulse pair signals toward a waveform which will increment the position of said motor means output by a standardized value in accordance with the rate output signal.

7. Apparatus as claimed in claim 6 comprising, in addition:

position error signal generating means, comprising a part of said modifying means, for supplying position error signals to be used in the generation of said pulse pair signals; and integration means, comprising a part of said modifying means, for accumulating position error signals to be used in modifying the waveform of said pulse pair signals to increase the rate of servo action in the motor loop for large values of position error signals.

8. Pulse operated position stepped servo apparatus comprising, in combination:

motor means including electrical signal input means and mechanical position output means;

velocity sensing means, connected to said motor means, for providing a first output signal indicative of magnitude of motor output position movement during a given time period subsequent to application of a control signal to drive said motor means;

command signal input means for supplying command signals; and summing means connected to said motor means, said velocity sensing means and said command signal input means for applying to said motor means the control signal which control signal comprises at least one pulse, said control signal operating to step position said motor means by a given position increment, the pulse signal being a composite of signals input to said summing means, the command signal being compensated by said first output signal to correct for detrimental forces acting to prevent said motor means position output means from halting in a position dictated by the last applied pulse signal.

* * * * *